United States Patent [19]
Gagliardo

[11] Patent Number: 6,039,065
[45] Date of Patent: Mar. 21, 2000

[54] FLUID PROPORTIONING VALVE AND METHOD

[75] Inventor: John P. Gagliardo, Shrewsbury, Mass.

[73] Assignee: Regal Products, Inc., Shrewsbury, Mass.

[21] Appl. No.: 09/264,417

[22] Filed: Mar. 8, 1999

[51] Int. Cl.$^7$ ..................................................... F16K 5/10
[52] U.S. Cl. ............................... 137/3; 251/208; 239/310
[58] Field of Search ................................. 251/208, 205; 137/3; 239/310

[56] References Cited

U.S. PATENT DOCUMENTS

| | | | |
|---|---|---|---|
| 3,949,966 | 4/1976 | Fabish | 251/208 X |
| 4,503,915 | 3/1985 | Gagliardo et al. | |
| 5,308,040 | 5/1994 | Torres | 251/208 |
| 5,368,059 | 11/1994 | Box et al. | 137/3 |
| 5,741,005 | 4/1998 | Vaughan et al. | 251/208 |
| 5,947,141 | 9/1999 | Nuss | 137/3 |

Primary Examiner—Kevin Lee
Attorney, Agent, or Firm—Fish & Richardson P.C.

[57] ABSTRACT

A fluid proportioning valve meters a flow of secondary fluid into a flow of primary fluid in a predetermined, controllable proportion of secondary fluid to primary fluid and in a predetermined, controlled volume flow of secondary fluid responsive to volume flow of primary fluid. The fluid proportioning valve includes: a housing defining a conduit in operation for flow of secondary fluid from an inlet in communication with a source of secondary fluid towards an outlet in communication with a source of primary fluid; a first valve element disposed within the housing and defining a first valve opening between inlet and outlet; and a second valve element disposed within the housing and defining a second valve opening between inlet and outlet. The first and second valve elements are mounted for relative movement in first and second degrees of motion, the first and second valve openings being in overlapping relationship in at least some position of the first and second valve elements, to permit flow of secondary fluid from the inlet toward the outlet.

8 Claims, 12 Drawing Sheets

FLUID PROPORTIONING VALVE AND METHOD

BACKGROUND OF THE INVENTION

Conventional fire-fighting equipment mixes a secondary fluid (such as a foaming agent) with a primary fluid (such as water) for extinguishment of certain types of fires. It is important that a precise, predetermined proportion (percentage) of foaming agent be added to the water because the foaming agent/water combination is most effective for extinguishment when an exact proportion is used, and also because using excess foaming agent is wasteful and expensive.

The foaming agent is usually added to the water by an eductor (Venturi) placed in a branched circuit flowing from the outlet of a water pump to the inlet of the pump. The water flows through the eductor, creating a suction (by Venturi action) which pulls in the foaming agent through a side inlet of the eductor, with the water and foaming agent thereafter flowing and mixing together. The eductor is basically a constant percentage pick-up device and requires a variable metering (proportioning) device between the foaming agent storage tank and the eductor, if the discharge flow rate varies, e.g. as when a plurality of fire-fighting nozzles supplied simultaneously are individually turned on and off during use. It can be difficult to maintain the proper proportion of foaming agent using a variable resistance passage. For the proportion of foaming agent-to-water to remain constant, the passage (metering) opening must be continually reset as the rate of fluid flow through the system changes due to the nozzles being cut in and out during the firefighting operation.

U.S. Pat. No. 4,503,915 describes a proportioning valve for use in fire-fighting equipment which automatically regulates the introduction of secondary fluid into a primary fluid flow. This valve contains a plurality of flow regulating passages (orifices), each being sized to accommodate a particular piece of fire-fighting equipment. for a particular percentage of foaming agent. The proper orifice is automatically opened and closed for a particular nozzle when that nozzle is discharged or shut down. If a foaming agent requiring a different percentage is to be used, the metering valve must be disassembled and rebuilt with a replacement component having the new required orifices. This system was a prior advance in this field by the present inventor, and others, over which the present invention represents a further improvement.

SUMMARY OF THE INVENTION

The present invention features a fluid metering valve which is particularly easy to control (either automatically or manually) and which is accurate in its proportioning of secondary fluid to primary fluid. In addition, it can easily be reset to handle a fluid requiring a different percentage or proportion of secondary fluid to primary fluid. Adjustment in a first degree of motion allows the valve to meter a predetermined, fixed proportion (percentage) of secondary fluid to primary fluid. Adjustment in a second degree of motion controls the amount of secondary fluid drawn through the valve, thereby to maintain the proper percentage over a wide range of flow rates.

In one aspect, the invention features a fluid proportioning valve for metering a flow of a secondary fluid into a flow of a primary fluid in a predetermined, controllable proportion of secondary fluid to primary fluid and in a predetermined, controlled volume flow of secondary fluid responsive to volume flow of primary fluid. The fluid proportioning valve includes: (a) a housing defining a conduit in operation for flow of secondary fluid from an inlet in connection with a source of secondary fluid towards an outlet in communication with a source of primary fluid; (b) a first valve element disposed within the housing and defining a first valve opening between the inlet and the outlet; and (c) a second valve element disposed within the housing and defining a second valve opening between the inlet and the outlet. The first valve element and the second valve element are mounted for relative movement in a first degree of motion and in a second degree of motion, the first valve opening and the second valve opening being in overlapping relationship in at least some position of the first valve element and the second valve element, to permit flow of secondary fluid from the inlet to the outlet.

Preferred embodiments include one or more of the following features. The first valve element is disposed in fixed relationship to the housing and the second valve element is disposed in moveable relationship to the housing and to the first valve element in a first degree of motion and in a second degree of motion. Relative movement of the first valve element and the second valve element in the first degree of motion varies the proportion of secondary fluid to primary fluid. The fluid proportioning valve further comprises a threaded assembly comprising a first threaded element and a second threaded element disposed for relative rotation in threaded engagement about an axis, the first threaded element being associated with said first valve element and the second threaded element being associated with the second valve element, whereby relative rotation of the first and second threaded elements of the threaded assembly causes relative movement of the first and second valve elements in the first degree of motion to vary the proportion of secondary fluid to primary fluid. Relative movement of the first valve element and the second valve element in the second degree of motion varies the volume flow of secondary fluid responsive to volume flow of primary fluid. The first valve element comprises a first cylindrical wall surface, the first cylindrical wall surface defining the first valve opening in the form of an aperture extending generally in a plane perpendicular to an axis of the first cylindrical surface, and the second valve element comprises a second cylindrical wall surface disposed in close opposition to and coaxial with the first cylindrical surface, the second cylindrical wall surface defining the second valve opening in the form of an aperture extending generally in a plane perpendicular to the axis. The valve further includes a valve actuator for relative movement of the first valve element and the second valve element in the second degree of motion, the valve actuator being responsive to volume flow of the primary fluid.

In another aspect, the invention features a method for metering a flow of a secondary fluid into a flow of a primary fluid in a predetermined, controllable proportion of secondary fluid to primary fluid and in a predetermined, controlled volume flow of secondary fluid responsive to volume flow of primary fluid. The method includes: (a) adjusting a fluid proportioning valve in a first degree of motion to set a predetermined controllable proportion of secondary fluid to primary fluid; and (b) in response to volume flow of primary fluid, adjusting the fluid proportioning valve in a second degree of motion to permit a controlled volume flow of secondary fluid responsive to the volume flow of primary fluid.

Other features and advantages of the invention will be apparent from the following description of a presently preferred embodiment, and from the claims.

DESCRIPTION OF THE PREFERRED EMBODIMENTS

Figure 1:
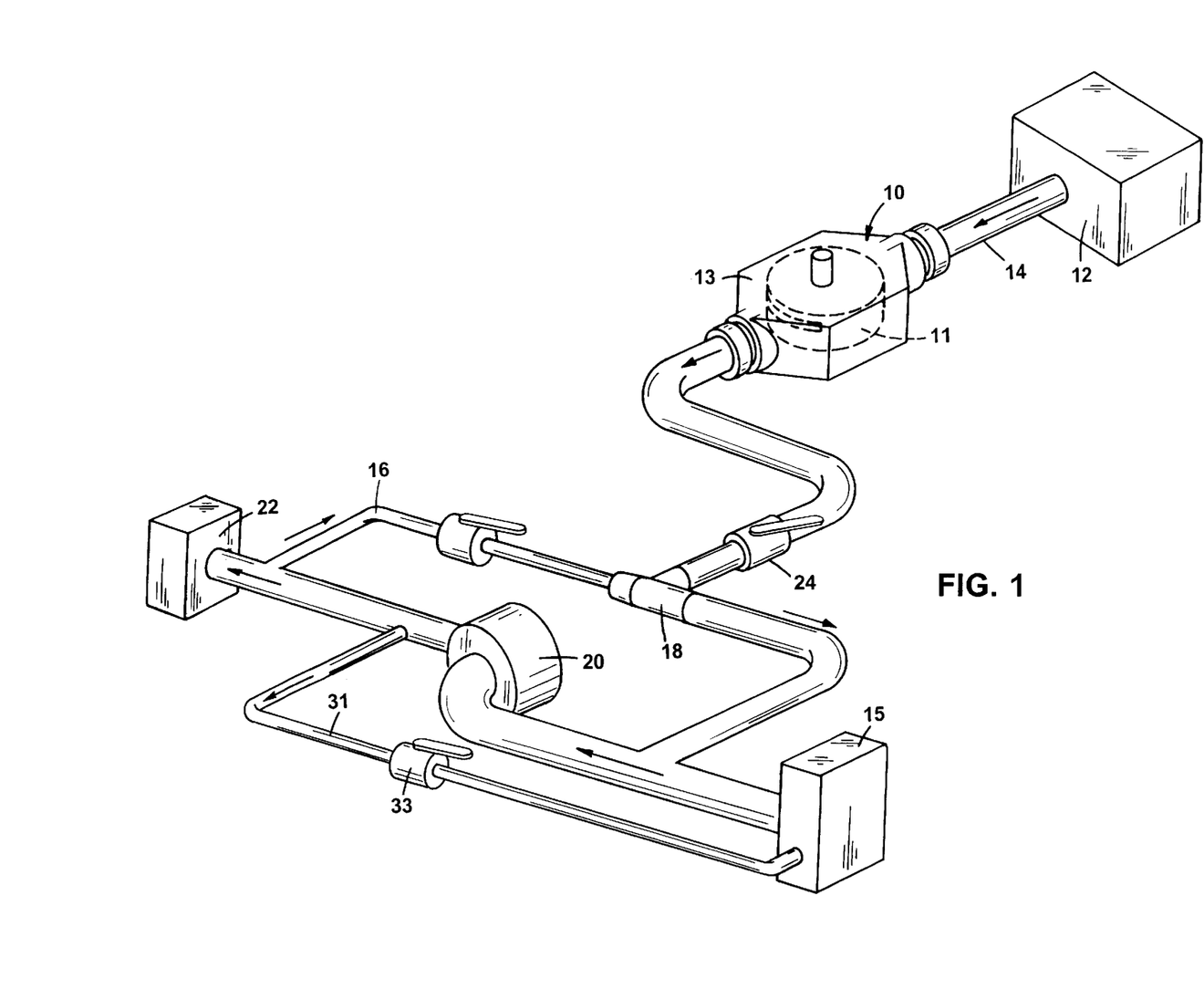
FIG. 1 is a schematic diagram of a fluid proportioning system, showing a fluid proportioning valve of the invention in use at a fire fighting scene.

Referring to FIG. 1, a fluid proportioning valve 10, shown in its use environment, delivers a predetermined proportion of a secondary fluid, e.g. a foaming agent, into a flow of primary fluid, e.g. water. In particular, foaming agent is delivered to the proportioning valve 10 from a foaming agent tank 12 through a conduit 14. The foaming agent is drawn through the proportioning valve by Venturi action of water flowing from water source 15 through the pump 20 and conduit 16, and thus through the eductor 18. The pump 20 moves fluid along the flow paths, including bypass conduit 31, with pressure control valve 33, returning flow of fluid of tank 15. The mixture of water and foaming agent introduced at the eductor 18 is delivered to one or more nozzles or other outlets 22, e.g., in a fire fighting system. (Though the word "foam" is often used to denote the foaming agent or foamant, it is more accurately the bubbles or froth formed by the solution of water and foaming agent as it is discharged from the nozzle.) A shut-off valve 24 allows flow of foaming agent to be shut off so the outlets can discharge only water as desired.

The nozzles 22 are separately turned on and off as appropriate during fighting of a fire, causing fluctuation in the requirements for flow of primary fluid. As discussed above, there is a preferred, predetermined ratio of foamant or foaming agent to water for each foamant typically employed in fire fighting operations. The flow of secondary fluid must be adjusted accordingly, so that the predetermined proportion of foamant to water is maintained substantially constant during the fire fighting operation. Proportioning valve 10 functions both to initially set the predetermined proportion or percentage, and to adjust the intake of foamant to compensate for changes in the flow of water, as will be explained in further detail below.

Figure 2:
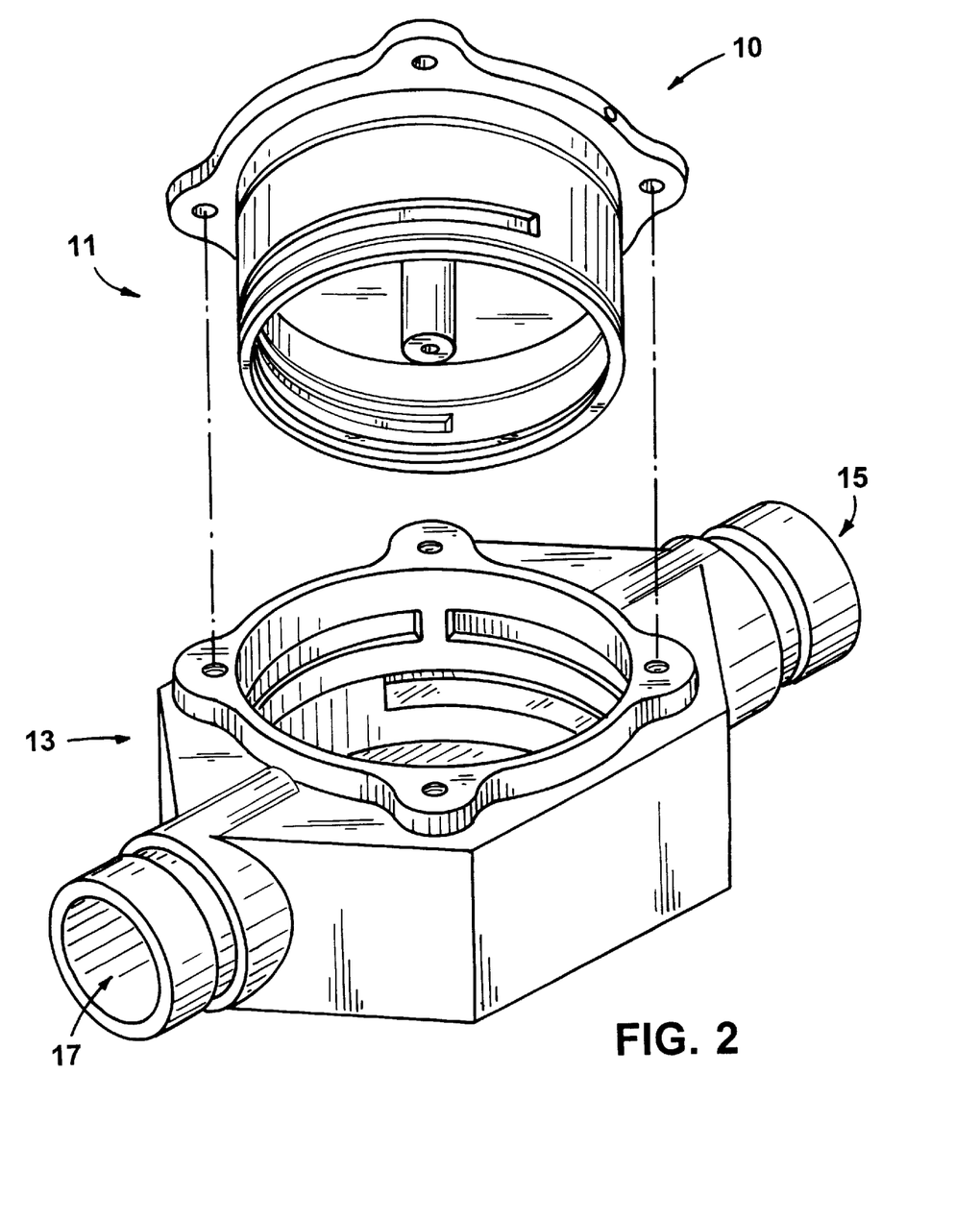
FIG. 2 is a partially exploded perspective view of a valve according to one embodiment of the invention, showing the valve removed from its housing.
Figure 2A:
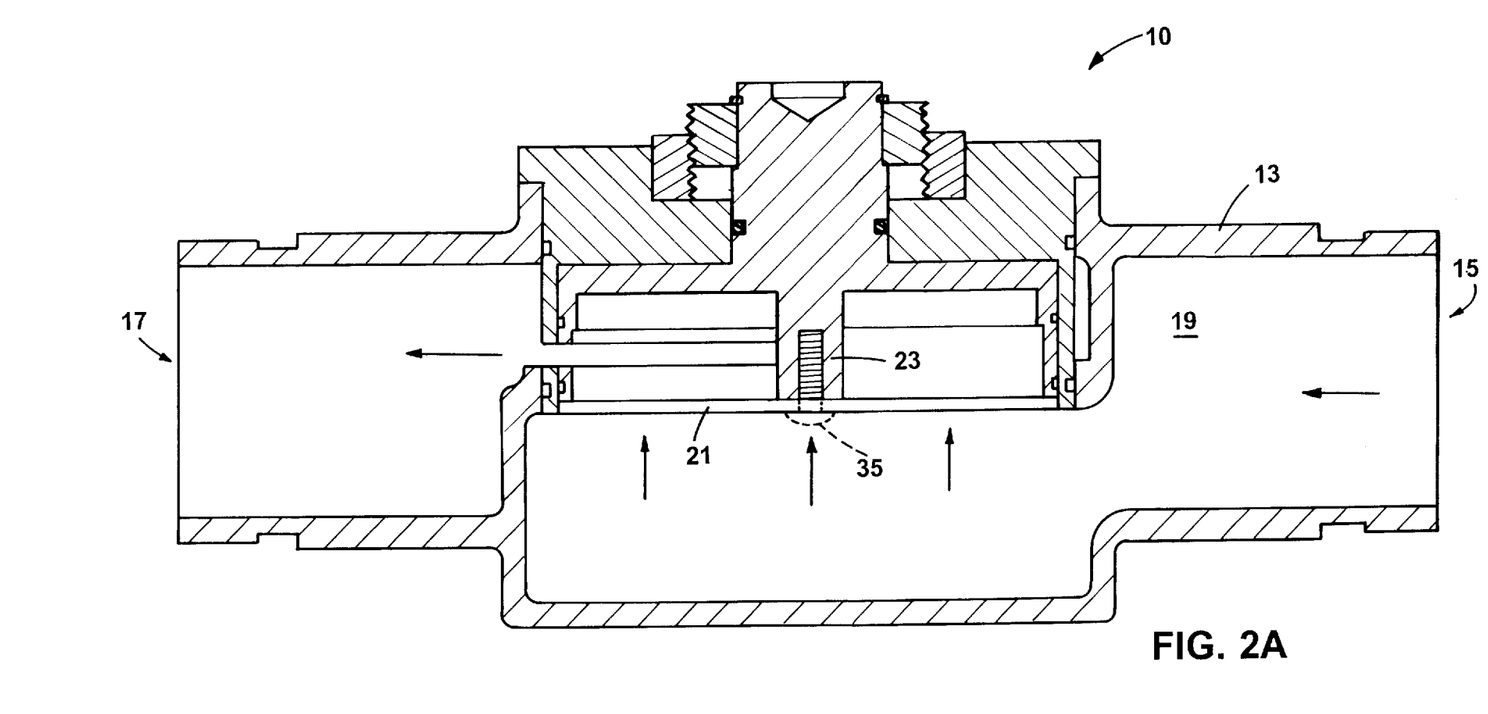
FIG. 2A is an axial cross-sectional view of the valve of FIG. 2.

Referring to FIGS. 2 and 2A, a proportioning valve 10 of the invention includes a valve assembly 11 comprised of the working components of proportioning valve 10, and a housing 13 in which the valve assembly 11 is disposed during use. Housing 13 defines a fluid inlet 15, a fluid outlet 17, and a passage 19 for fluid flow in the direction of the arrows in FIG. 2A, through the valve assembly 11. A strainer 21 (e.g., a wire mesh disk, secured by screw 35) is mounted at the end of stem 23 of valve assembly 11, to remove any large particles from the fluid as it passes from the inlet 15 into the valve. (For the sake of clarity, strainer 21 is shown only in FIG. 2A.)

Figure 3:
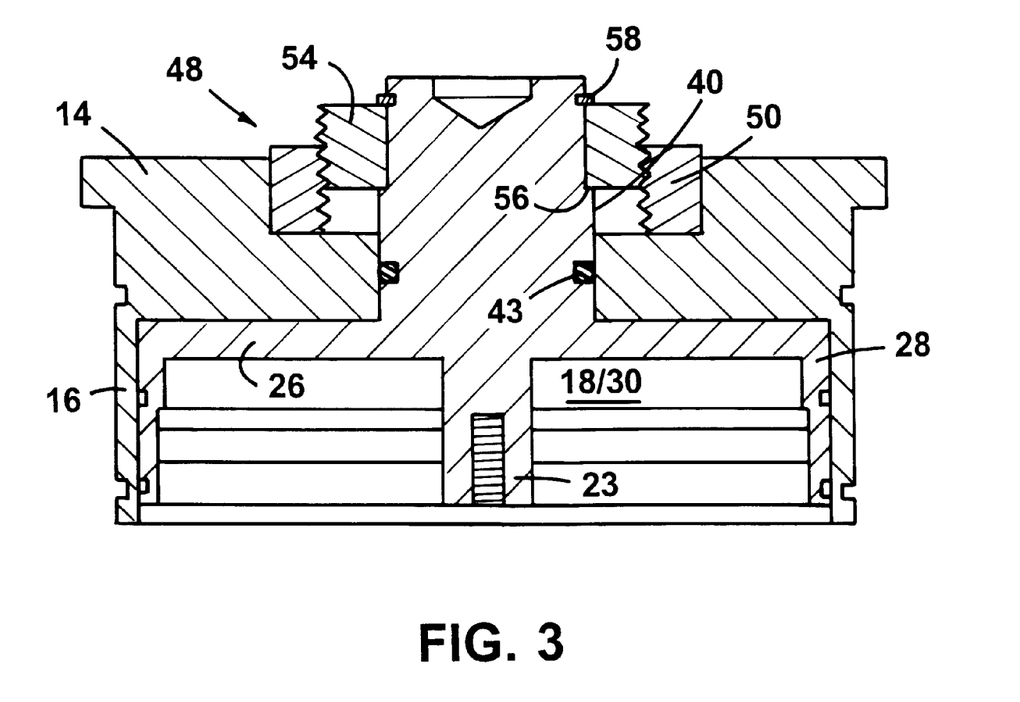
FIGS. 3 and 3A are, respectively, an axial cross-sectional view and an exploded axial cross-sectional view of the working components of a fluid proportioning valve, removed from the housing, according to one embodiment of the invention.
Figure 3A:
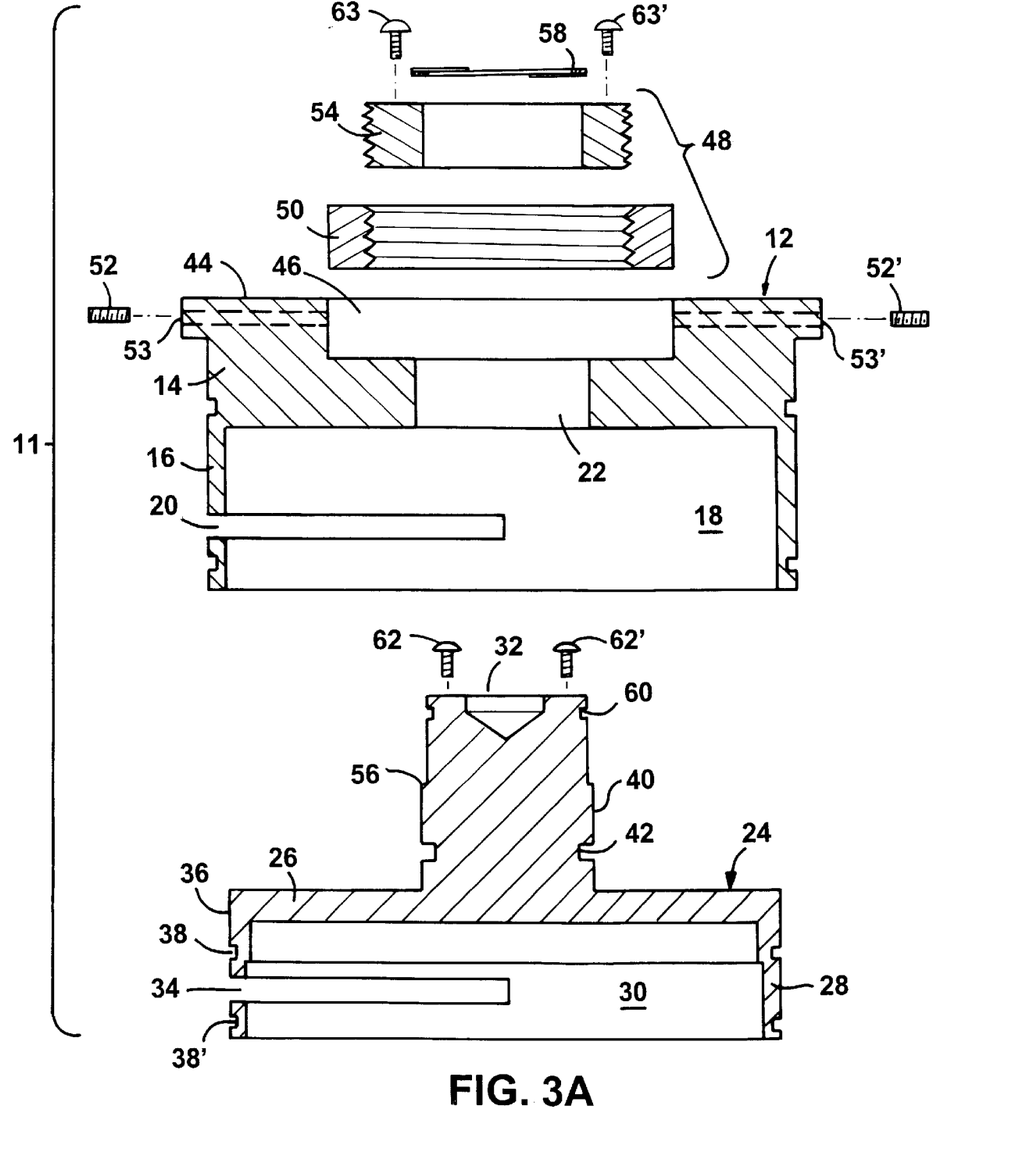
Figure 3B:
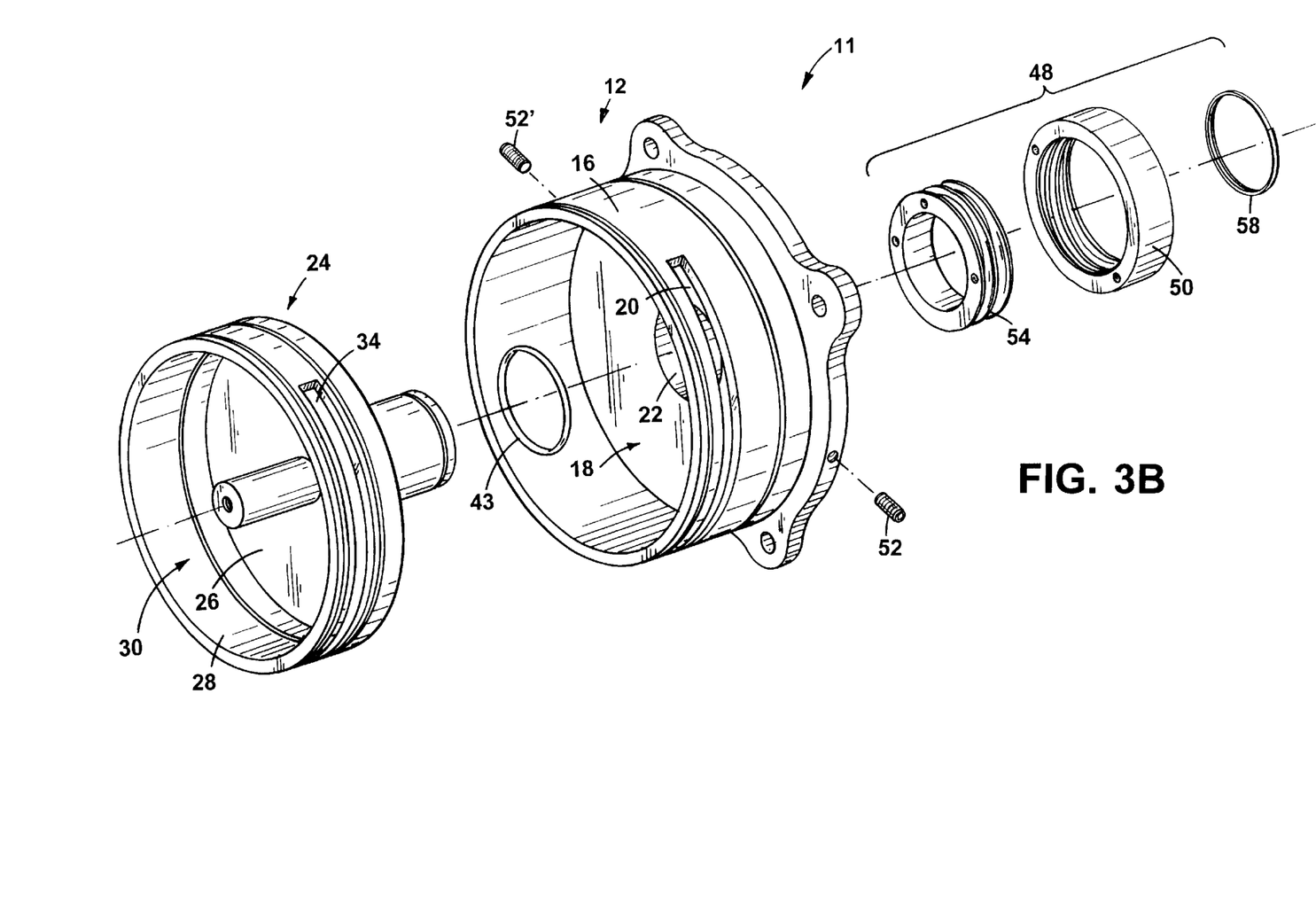
FIG. 3B is an exploded perspective view of the valve components of FIG. 3.

Referring to FIGS. 3–3B, valve assembly 11 of proportioning valve 10 of the invention includes a first (fixed) valve component 12 and a second (moveable) valve component 24. The first valve component 12 has a top wall 14 and a cylindrical side wall 16 which together define a chamber 18. The side wall further defines a valve opening in the form of a valve housing slot 20. The top wall 14 defines an axial aperture 22. The second valve component 24, disposed generally within chamber 18, has a top wall 26 and a cylindrical side wall 28, which together define a chamber 30. A valve stem 32 extends axially from the top wall 26, through aperture 22 in top wall 14 of the first valve component 12. The sidewall 28 of second valve component 24 defines a valve opening in the form of second valve slot 34, which can be moved into and out of communication with first valve slot 20, both rotationally and axially, as will be described more fully below.

The outer surface 36 of valve component side wall 28 defines circumferential grooves 38, 38' at opposite sides (axially) of second valve slot 34, each slot for receiving an o-ring (not shown) to provide sealing between the opposed side wall surfaces of the first and second components 12, 24. The outer surface 40 of valve stem 32 defines a circumferential groove 42 for receiving on o-ring 43 to provide sealing between the opposed surfaces of first valve component 12 and valve stem 32.

The outer surface 44 of the first valve component top wall 14 defines a coaxial counter bore 46 (FIG. 3A) within which is disposed cooperating components of a threaded assembly 48. The outer (female) component 50 of the threaded assembly is secured to the first valve component 12 by engagement of threaded set screws 52, 52' in bores 53, 53' (FIG. 3A). This arrangement also permits rotational adjustment of the position of the threaded assembly 48 relative to the first valve component 12. The inner (male) component 54 of the threaded assembly 48 is fixedly mounted for rotation about the valve stem 32 between valve stem shoulder 56 and snap ring 58 engaged in circumferential groove 60 defined in the valve stem outer surface 40.

As discussed above, second valve slot 34 can be moved into and out of registration with the first valve slot 20, both axially and rotationally. These two types of adjustability will now be explained in further detail.

Figure 4:
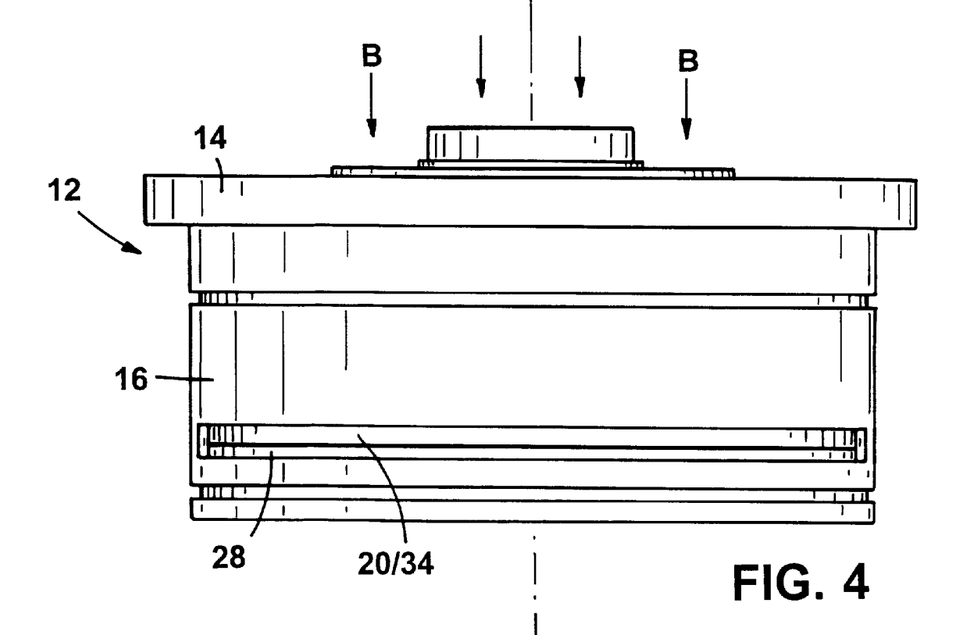
FIGS. 4 and 4A are side plan views of the valve components of FIG. 3 illustrating the relative axial movement of the valve components.
Figure 4A:
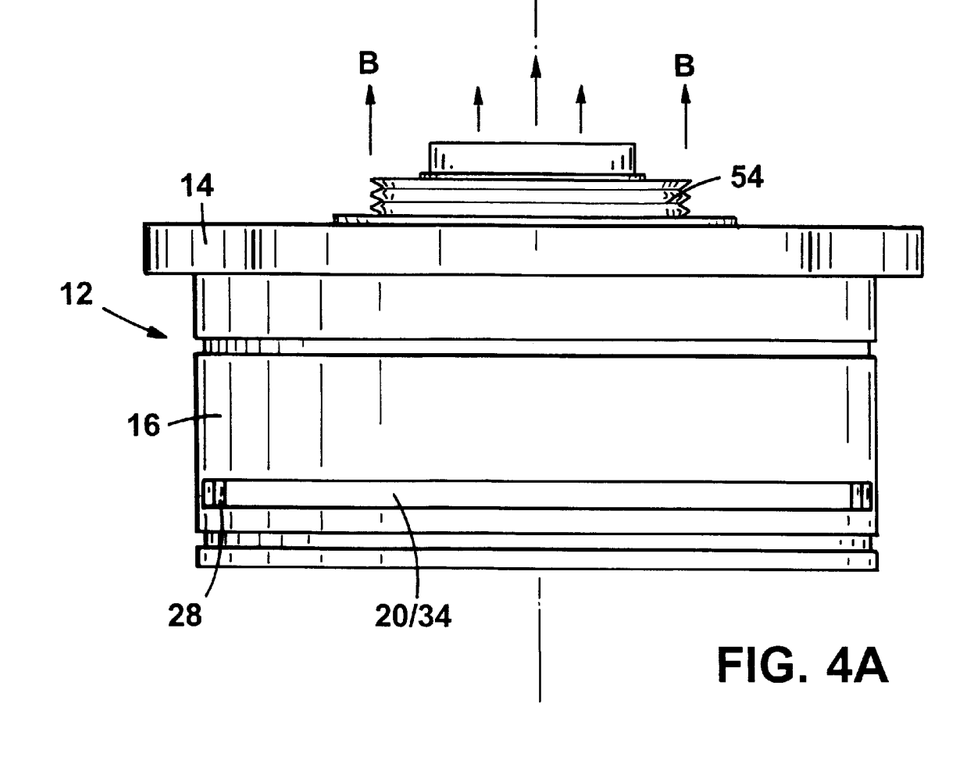

Adjustment of the axial positioning of the second valve slot 34 relative to the first valve slot 20 controls the proportion of secondary fluid to primary fluid, e.g., the proportion or percentage can be set at a conventional level such as 1%, 3% or 6%. This adjustment is generally made initially, when the foaming agent to be used is selected, and typically is not changed until a decision is made for use of a different foaming agent. As a result, this adjustment can, in most cases, be easily made manually by an operator, if automatic adjustment is not desired. Axial adjustment is accomplished by rotation of the inner component 54 of the threaded assembly relative to the fixed, outer component 50. As shown in FIGS. 4 and 4A, the rotation of the threaded assembly translates to movement of the second valve component 24 up or down relative to the first valve component 12 (arrows B), which, in turn, causes relative axial movement between slots 20 and 34. In FIG. 4, the slots are in partial axial registration, e.g., for a relatively low proportion of secondary fluid to primary fluid, while in FIG. 4A the slots are in full axial registration, e.g., for the maximum proportion of secondary fluid to primary fluid that can be accommodated in a proportioning valve 10. For manual adjustment, a handle may be attached to the inner (male) component 54 of the threaded assembly 48 by screws 63, 63' (FIG. 3A).

Figure 5:
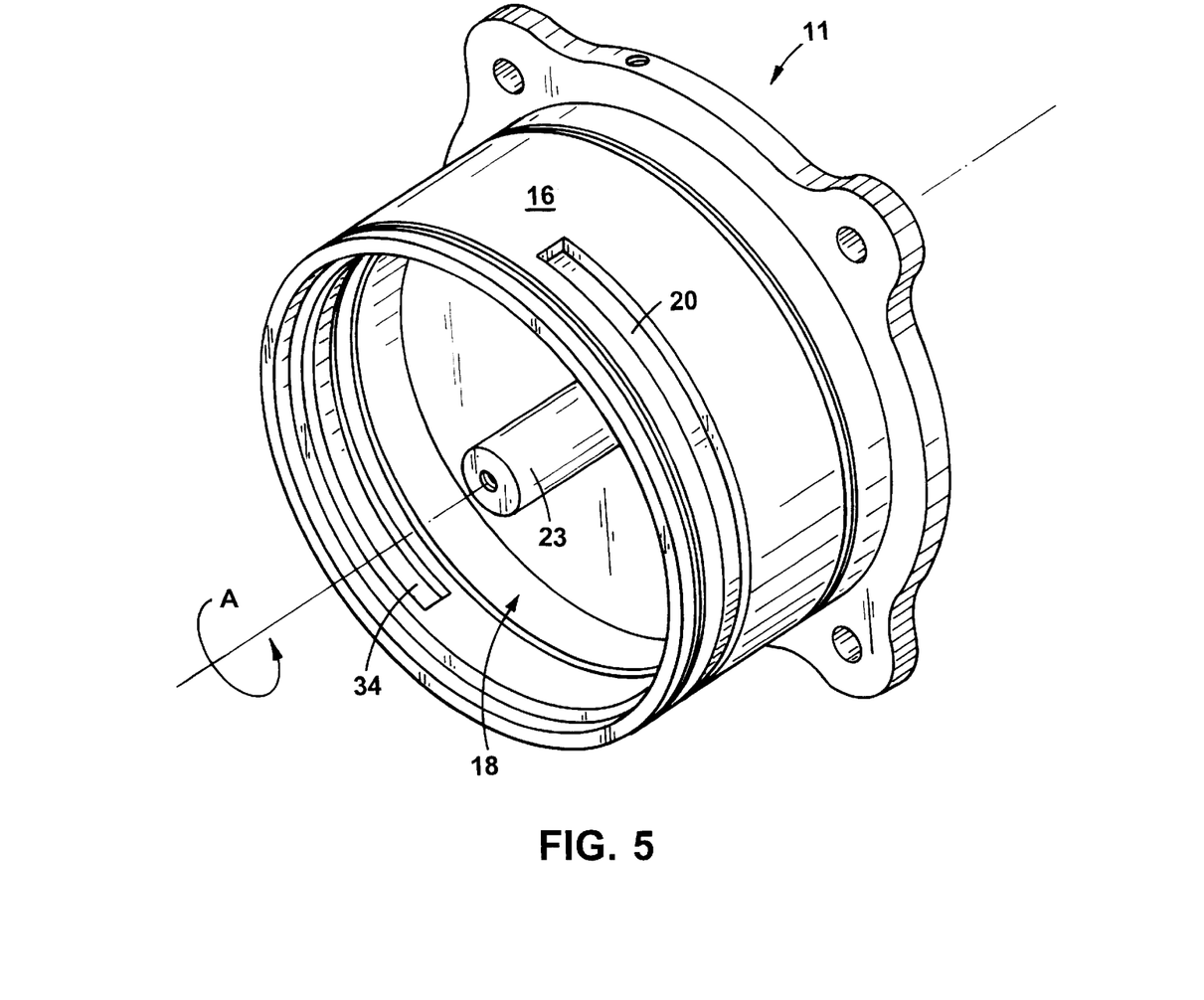
FIGS. 5, 5A and 5B are perspective views of the valve components of FIG. 3 shown in different rotational positions.
Figure 5A:
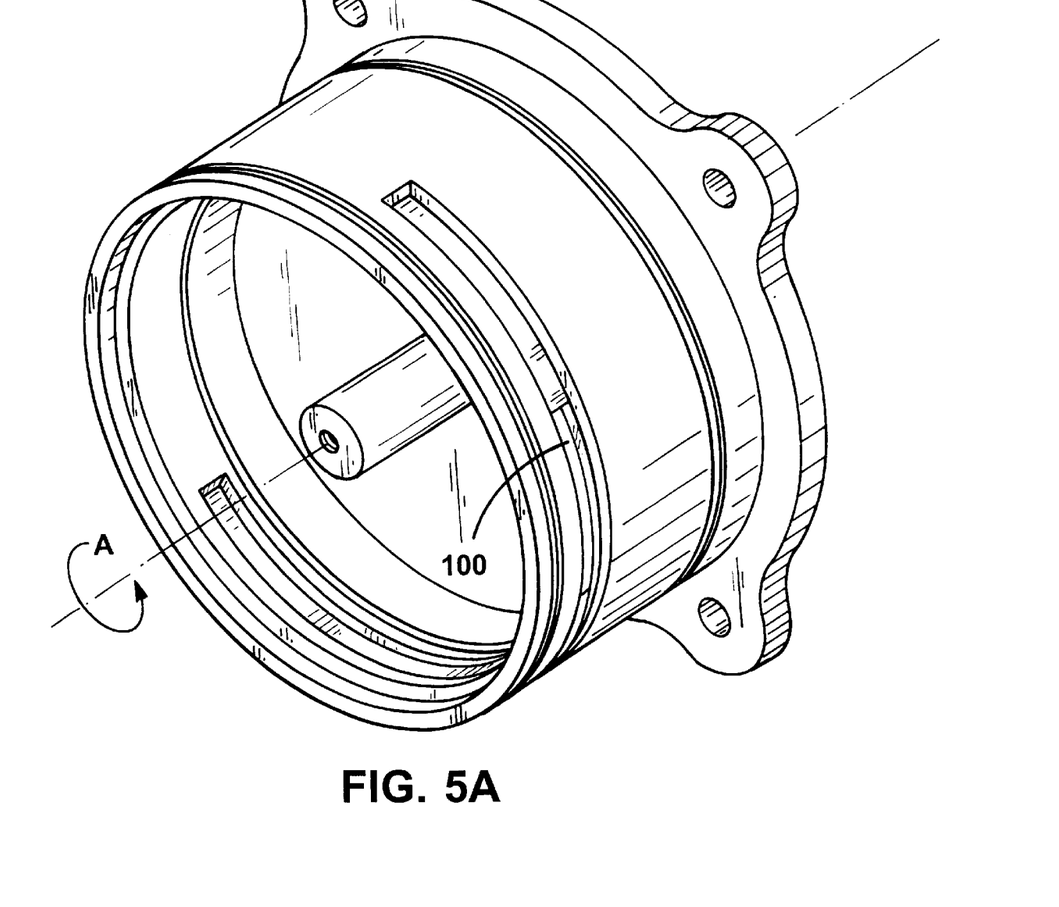
Figure 5B:
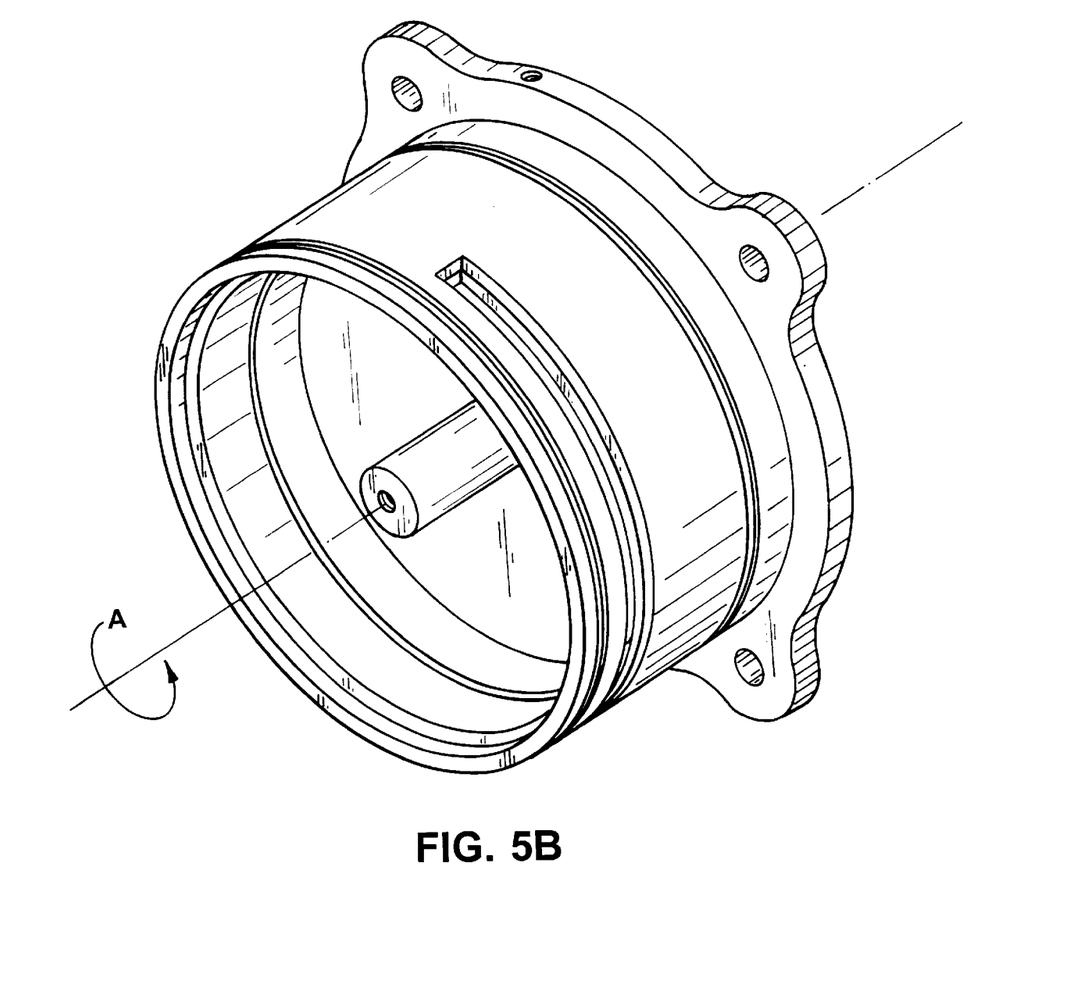
Figure 6:
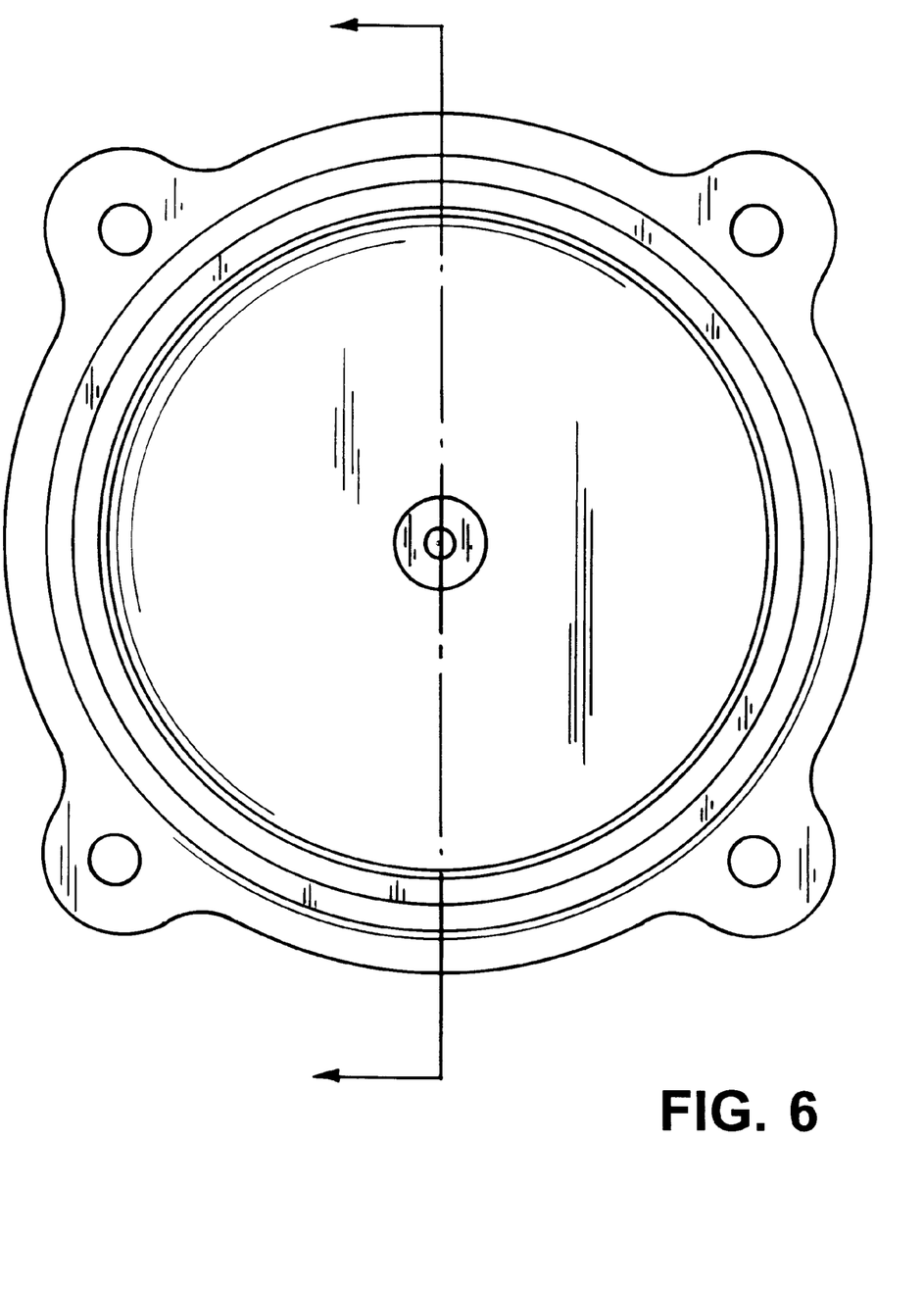
FIG. 6 is a bottom plan view of the valve of FIG. 3.
Figure 7:
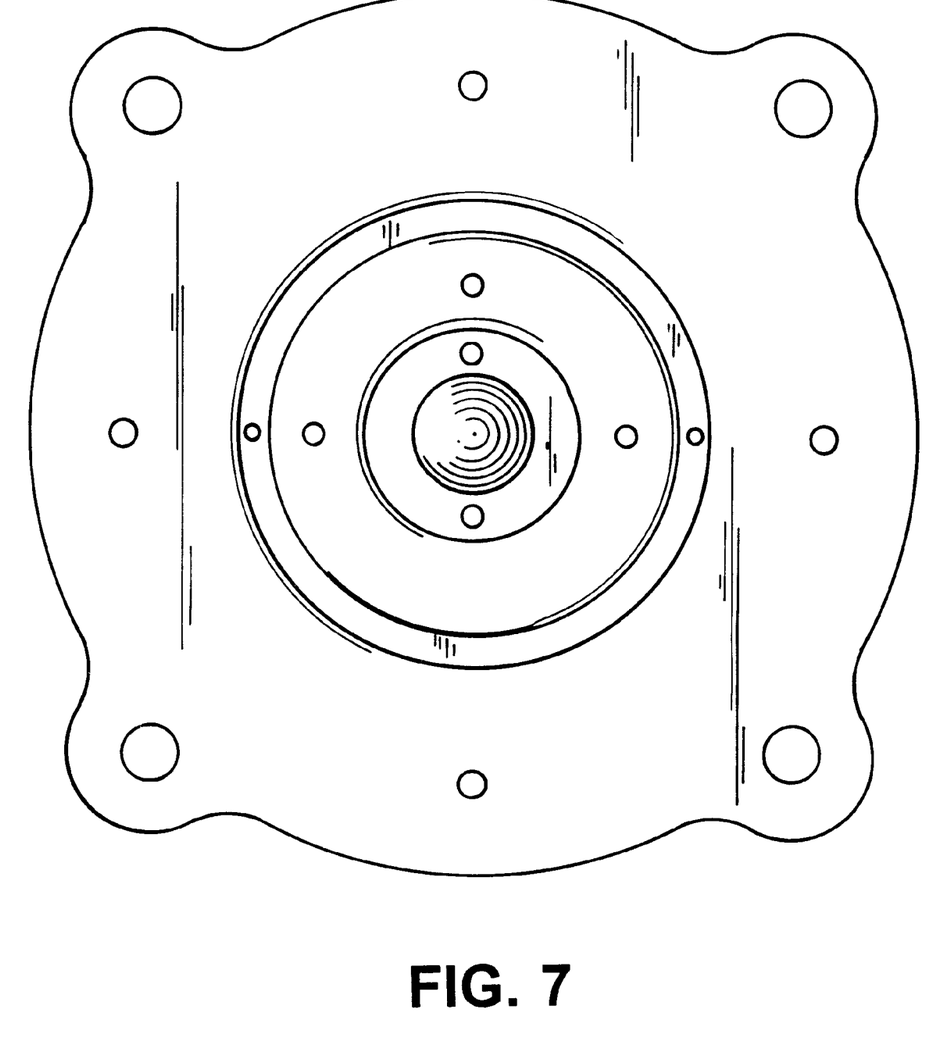
FIG. 7 is a top plan view of the valve of FIG. 3.

Relative rotational movement of the slots serves to adjust the amount of the secondary fluid (foaming agent) allowed to flow through the valve chamber, in response to changes in the flow rate of primary fluid discharged from the vehicle during operation of the system. As discussed above, this adjustment is necessary in order to maintain a fixed proportion of secondary fluid to primary fluid, e.g., when the flow rate of primary fluid is increased, the valve opening must also increase proportionately to allow more secondary fluid to flow through the valve. Rotational adjustment is preferably performed automatically, to eliminate the need for an operator to monitor the flow rate of primary fluid and continuously make adjustments to the valve opening. The valve is shown in various phases of rotational adjustment in FIGS. 5, 5A and 5B, with arrow A indicating the direction of rotation of the second valve component 24. In FIG. 5, the valve is completely closed (i.e., the slots are completely out of rotational communication); in FIG. 5A the valve is partially open, defining an open area 100 for flow of secondary fluid; in FIG. 5B the valve is completely open (i.e., the slots are in full rotational registration). For manual rotational positioning of the second valve slot 34 relative to the first valve slot 20, a handle may be attached to the valve stem 32 by screws 62, 62' (FIG. 3A).

One or both degrees of motion may by controlled by computer and/or electronically, e.g., with rotation for control of secondary fluid flow volume adjusted in response to measured flow of primary (or mixed) fluid, with handles provided only for manual override.

Other embodiments are within the following claims.

What is claimed is:

1. A fluid proportioning valve for metering a flow of a secondary fluid into a flow of a primary fluid in a predetermined, controllable proportion of secondary fluid to primary fluid and in a predetermined, controlled volume flow of secondary fluid responsive to volume flow of primary fluid;

said fluid proportioning valve comprising:
   a housing defining a conduit in operation for flow of secondary fluid from an inlet in connection with a source of secondary fluid towards an outlet in communication with a source of primary fluid,
   a first valve element disposed within said housing and defining a first valve opening between said inlet and said outlet,
   a second valve element disposed within said housing and defining a second valve opening between said inlet and said outlet,
   said first valve element and said second valve element mounted for relative movement in a first degree of motion and in a second degree of motion, said first valve opening and said second valve opening being in overlapping relationship in at least some position of said first valve element and said second valve element, thereby to permit flow of secondary fluid from said inlet to said outlet.

2. The fluid proportioning valve of claim 1 wherein said first valve element is disposed in fixed relationship to said housing and said second valve element is disposed in moveable relationship to said housing and to said first valve element in a first degree of motion and in a second degree of motion.

3. The fluid proportioning valve of claim 1 wherein relative movement of said first valve element and said second valve element in said first degree of motion varies the proportion of secondary fluid to primary fluid.

4. The fluid proportioning valve of claim 3 further comprising a threaded assembly comprising a first threaded element and a second threaded element disposed for relative rotation in threaded engagement about an axis, wherein said first threaded element is associated with said first valve element and said second threaded element is associated with said second valve element, whereby relative rotation of said first threaded element and said second threaded element of said threaded assembly causes said relative movement of said first valve element and said second valve element in said first degree of motion to vary the proportion of secondary fluid to primary fluid.

5. The fluid proportioning valve of claim 1 or 4, wherein relative movement of said first valve element and said second valve element in said second degree of motion varies the volume flow of secondary fluid responsive to volume flow of primary fluid.

6. The fluid proportioning valve of claim 5 wherein said first valve element comprises a first cylindrical wall surface, said first cylindrical wall surface defining said first valve opening in the form of an aperture extending generally in a plane perpendicular to an axis of said first cylindrical surface, and said second valve element comprises a second cylindrical wall surface disposed in close opposition to and coaxial with said first cylindrical surface, said second cylindrical wall surface defining said second valve opening in the form of an aperture extending generally in a plane perpendicular to said axis, and said relative movement of said first valve element and said second valve element in said second degree of motion varies the volume flow of secondary fluid responsive to volume flow of primary fluid.

7. The fluid proportioning valve of claim 5 further comprising a valve actuator for relative movement of said first valve element and said second valve element in the second degree of motion, said valve actuator being responsive to volume flow of the primary fluid.

8. A method for metering a flow of a secondary fluid into a flow of a primary fluid in a predetermined, controllable proportion of secondary fluid to primary fluid and in a predetermined, controlled volume flow of secondary fluid responsive to volume flow of primary fluid, said method comprising the steps of:
   (a) adjusting a fluid proportioning valve in a first degree of motion to set a predetermined controllable proportion of secondary fluid to primary fluid; and
   (b) in response to volume flow of primary fluid, adjusting the fluid proportioning valve in a second degree of motion to permit a controlled volume flow of secondary fluid responsive to the volume flow of primary fluid.

* * * * *